(12) United States Patent
Mori et al.

(10) Patent No.: US 6,281,991 B1
(45) Date of Patent: Aug. 28, 2001

(54) SELF-ILLUMINATION SCANNER APPARATUS

(75) Inventors: Takeshi Mori, Machida; Kazuo Ishimoto, Gifu; Tohru Watanabe, Ogaki, all of (JP)

(73) Assignees: Olympus Optical Co., Ltd., Tokyo; Sanyo Electric Co., Ltd., Osaka, both of (JP)

(*) Notice: Subject to any disclaimer, the term of this patent is extended or adjusted under 35 U.S.C. 154(b) by 0 days.

(21) Appl. No.: 09/149,907

(22) Filed: Sep. 8, 1998

(30) Foreign Application Priority Data

Sep. 22, 1997 (JP) .................................................... 9-257282

(51) Int. Cl.[7] .................................................. H04N 1/04
(52) U.S. Cl. .......................... 358/475; 358/474; 358/471
(58) Field of Search ................................. 358/475, 509, 358/474, 471, 487, 506; 348/96, 97, 294; 361/800

(56) References Cited

U.S. PATENT DOCUMENTS 4,823,191  4/1989  Andoh et al. .................... 348/294
6,111,739 * 8/2000  Wu et al. ......................... 361/106

FOREIGN PATENT DOCUMENTS 0 670 555 A1   9/1995  (EP) .

* cited by examiner

Primary Examiner—Cheukfan Lee
(74) Attorney, Agent, or Firm—Frishauf, Holtz, Goodman, Langer & Chick, P.C.

(57) ABSTRACT

An illumination light-emitting member is made up of an LED group obtained by connecting a plurality of LEDs in series with each other, and illuminates the surface to be sensed including an image. A solid-state image sensing element receives light reflected by the surface to be sensed illuminated by the illumination light-emitting member, and outputs a corresponding sensed image signal. A drive circuit controls driving of the solid-state image sensing element to sense the image. A booster circuit serves as a power supply circuit for the LED group, and generates a high voltage by adding a predetermined power supply voltage in the apparatus, and a frequency-divided pulse obtained by frequency-dividing a predetermined pulse output from the drive circuit.

6 Claims, 7 Drawing Sheets

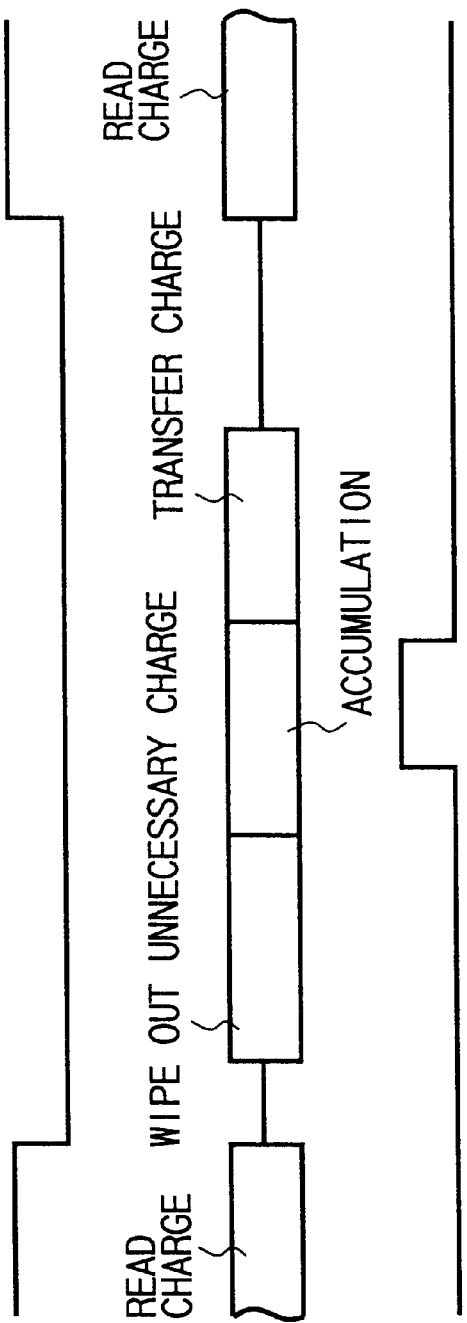

SELF-ILLUMINATION SCANNER APPARATUS

BACKGROUND OF THE INVENTION

The present invention relates to a self-illumination scanner apparatus which reads an image by illuminating a surface to be sensed including various kinds of optically readable images such as code patterns, characters, patterns, and the like printed on, e.g., a paper sheet using an illumination light-emitting member comprising an LED (light-emitting diode), and receiving light. reflected by the illuminated surface to be sensed.

Conventionally, various self-illumination scanner apparatuses of this type are known.

The assignee of the present invention has proposed a system for recording audio information on a recording medium such as a paper sheet in the form of a dot code which serves as image information, i.e., encoded information, that can be transmitted via a facsimile apparatus and can produce a large quantity of copies at low cost, and which is defined by a two-dimensional matrix of a plurality of dots, and also a system for reproducing the dot code, as disclosed in, e.g., EP0670555A1, which describes a self-illumination scanner apparatus for optically reading the dot code.

As an illumination light-emitting member for such self-illumination scanner apparatus, an LED is normally used since it is relatively inexpensive, is easily available, and can be driven at a lower voltage than other illumination light-emitting members.

However, LEDs have shortcomings, i.e., variations in internal resistance upon operation in units of elements.

For example, when a circuit arrangement shown in FIG. 1, i.e., a parallel circuit of a plurality of LEDs is used, the drive currents differ in units of elements at a ratio that depends on their internal resistance ratio, resulting in variations in the amount of light emitted by the respective LED elements.

As another shortcoming, since LEDs have variations in current-light amount conversion efficiency in units of elements, variations in drive current further promote variations in the amount of light emitted.

Consequently, when the circuit arrangement shown in FIG. 1 is used as an illumination light-emitting member in the above-mentioned self-illumination scanner apparatus, even if the plurality of LEDs are disposed at equal angular intervals in an annular pattern around a solid-image image sensing element, the brightness on the surface to be sensed becomes nonuniform due to. variations in light amount emitted by the respective LED elements, and each dot in a dot code is hard to accurately recognize and read as a dot.

In order to solve such problem, a circuit arrangement as a series circuit of a plurality of LEDs shown in FIG. 2 may be used.

According to this circuit arrangement, since the variations in internal resistance in units of LED elements are averaged by the serially connected LEDs, these variations can be suppressed consequently.

However, when the arrangement show in FIG. 2 is used, a high voltage must be applied to a terminal A, and a high-voltage generation circuit must be added.

More specifically, in the arrangement of EP0670555A1, since a plurality of LEDs are controlled to emit light instantaneously, the drive current required for obtaining a necessary light amount becomes high.

The anode-cathode voltage of each LED nonlinearly increases with increasing current. For this reason, when three LEDs are connected in series with each other, as shown in, e.g., FIG. 2, if a current of nearly 100 mA is applied to one column, the voltage across the terminals A and B becomes as high as about 7V due to the forward-bias voltage of the LEDs.

In practice, a drive circuit for the LEDs has an arrangement shown in FIG. 3.

In this case, since a constant current circuit alone requires several V, a high voltage of at least 10V is required at the terminal A.

Also, when a solid-state image sensing element such as a charge coupled device (CCD) or the like exclusively used in the self-illumination scanner apparatus is driven, a high voltage is required since a capacitive load must be driven.

Hence, the power supply for the illumination LEDs may be commonly used as that for driving this solid-state image sensing element.

Unfortunately, since the power supply for the LEDs has a large sag owing to heavy instantaneous load upon light emission, direct use of the power supply for the solid-state image sensing element that requires a stable power supply as that for the LEDs is extremely unpreferable.

In view of the foregoing, in order to realize the circuit arrangement shown in FIG. 2, an additional high-voltage generation circuit is required. However, if this circuit is merely added, another problem, i.e., an increase in size or weight of the apparatus, is posed.

BRIEF SUMMARY OF THE INVENTION

The present invention has been made in consideration of the above situation, and has as its object to provide a self-illumination scanner apparatus which can attain its size reduction by effectively using an existing predetermined power supply in the apparatus and a predetermined pulse used for driving a solid-state image sensing element, and can maximize the reading performance of an image such as a dot code or the like.

In order to achieve the above object, according to the first aspect of the present invention, there is provided a self-illumination scanner apparatus which comprises an illumination light-emitting member for illuminating a surface to be sensed including an image, a solid-state image sensing element for receiving light reflected by the surface to be sensed illuminated by the illumination light-emitting element, and generating an image signal corresponding to the image of the surface, and a drive circuit for controlling driving of the solid-state image sensing element to sense the image, wherein the illumination light-emitting member is an LED group prepared by connecting a plurality of LEDs in series with each other, and the apparatus comprises, as a power supply circuit for the illumination light-emitting member, a booster circuit for generating a high voltage by piling up a predetermined power supply voltage in the apparatus, and a frequency-divided pulse obtained by frequency-dividing a predetermined pulse output from the drive circuit.

Corresponding Embodiment of the Invention

The first, second, and third embodiments of the present invention correspond to the first aspect.

Not that a plurality of pulses to be used in an image sensing circuit with this arrangement are output in these embodiments. Also, a one-shot pulse may be added to a DC voltage.

Operation and Advantage

According to this arrangement, a self-illumination scanner apparatus which can attain a size reduction of the apparatus, and can maximize the reading performance of an image such as a dot code or the like can be provided.

Furthermore, this arrangement can be suitably used especially in a hand-held scanner apparatus.

According to the second aspect of the present invention, there is provided a self-illumination scanner apparatus wherein the predetermined power supply voltage in the apparatus is a power supply voltage to be supplied to at least one of the solid-state image sensing element and drive circuit before it is boosted to a voltage value required in at least one of the solid-state image sensing element and drive circuit, in the arrangement of the first aspect.

Corresponding Embodiments of the Invention

The first embodiment of the present invention corresponds to the second aspect.

Operation and Advantage

According to this arrangement, in addition to the advantage of the first aspect, a self-illumination scanner apparatus which can effectively use an existing power supply without adversely influencing the operation of the solid-state image sensing element and the like can be provided.

According to the third aspect of the present invention, there is provided a self-illumination scanner apparatus, wherein the booster circuit piles on and outputs a plurality of frequency-divided pulses having different phases as the frequency-divided pulses, in the arrangement of the first aspect.

Corresponding Embodiments of the Invention

The first embodiment of the present invention corresponds to the third aspect.

Operation and Advantage

In addition to the advantage of the first aspect, the voltage value range that can be set is broadened, and the self-illumination scanner apparatus can have higher versatility.

According to the fourth aspect of the present invention, there is provided a self-illumination scanner apparatus, wherein the frequency-divided pulse is input to the booster circuit via a current amplifying buffer circuit corresponding to the frequency-divided pulse, in the arrangement of the first or third aspect.

Corresponding Embodiments of the Invention

The second embodiment of the present invention corresponds to the fourth aspect.

Operation and Advantage

With this arrangement, in addition to the advantage of the first aspect, the drive current from an IC can be reduced, and reliable boosting can be attained.

According to the fifth aspect of the present invention, there is provided a self-illumination scanner apparatus, wherein the frequency of the frequency-divided pulse during a predetermined period including at least a light-emitting period of the illumination light-emitting member, which is set within a vertical blanking period excluding the read-out period of an effective sensed image signal from the solid-state image sensing element, is set to be higher than the frequency of the voltage-divided pulse during a period other than the predetermined period.

Corresponding Embodiments of the Invention

The third embodiment of the present invention corresponds to the fifth aspect.

Operation and Advantage

With this arrangement, since the load on an illumination power supply increases upon emitting light, i.e., upon driving the LEDs, high-speed pulses are used during that period to improve power supply efficiency, thus preventing the power supply voltage from dropping.

Also, with this arrangement, electric power to be supplied from the booster circuit can be decreased after light emission, and variations in power supply of an image sensing power supply circuit in periods other than those upon emitting light can be suppressed.

More specifically, according to this arrangement, in addition to the effect of the first aspect, a power supply voltage can be supplied to the LEDs more efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 5A to 5F are charts for explaining the generation timings of pulses LPP1 and LPP2 used in the first embodiment;

DETAILED DESCRIPTION OF THE INVENTION

Figure 1:
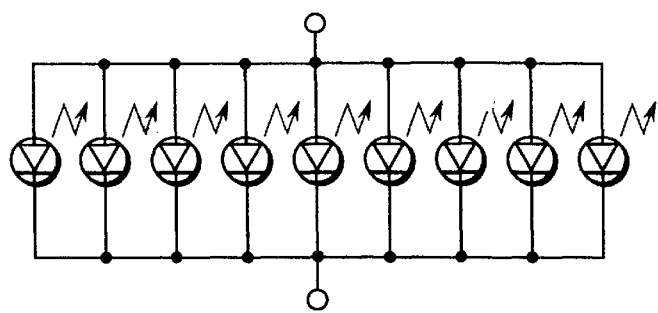
FIG. 1 is a circuit diagram showing the circuit arrangement obtained by connecting a plurality of LEDs in parallel with each other as an illumination light-emitting member of a conventional self-illumination scanner apparatus.

Reference will now be made in detail to the presently preferred embodiments of the invention as illustrated in the accompanying drawings, in which like reference characters designate like or corresponding parts throughout the several drawings.

The preferred embodiments of the present invention will be described hereinafter with reference to the accompanying drawings.

FIRST EMBODIMENT

Figure 4:
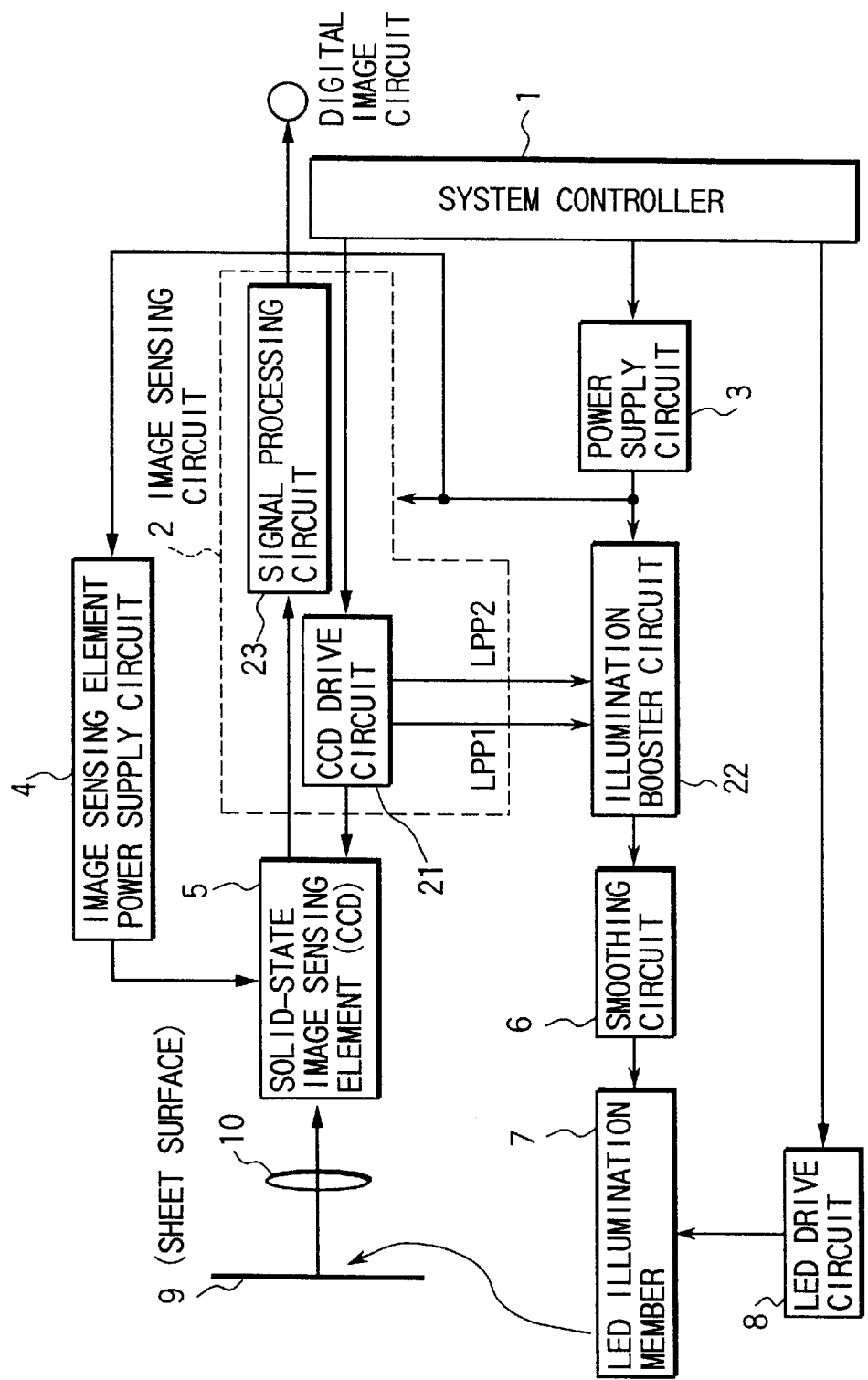
FIG. 4 is a block diagram showing the circuit arrangement of a self-illumination scanner apparatus according to the first embodiment of the present invention.

FIG. 4 is a block diagram showing the circuit arrangement of a self-illumination scanner apparatus according to the first embodiment of the present invention.

A system controller 1 starts operation in response to an activation signal input by a switch (not shown), and sets a power supply circuit 3 in an operation mode.

The power supply circuit 3 supplies a power supply voltage (5V in this embodiment) to an image sensing circuit 2 including a CCD drive circuit 21 and a signal processing circuit 23.

The reason why the power supply of the image sensing circuit 2 is turned on/off is to attain power savings of the self-illumination scanner apparatus as a whole.

Also, the power supply circuit 3 supplies a voltage to an image sensing element power supply circuit 4.

The image sensing element power supply circuit 4 generates a power supply voltage of, e.g., approximately 5V, required for charge detection at the output stage of a solid-state image sensing element (CCD) 5, on the basis of the voltage supplied from the power supply circuit 3.

After the power supply voltage is supplied, the CCD drive circuit 21 for driving the solid-state image sensing element (CCD) 5 used as an area sensor in this embodiment starts operation in response to a control signal supplied from the system controller 1.

The solid-state image sensing element (CCD) 5 is a CCD solid-state image sensing element including a plurality of light-receiving pixels for generating charges via photoelectric conversion, and a plurality of shift registers for transferring and outputting these charges, and is driven by a plurality of types of multi-phase transfer clocks.

As such CCD solid-state image sensing element, an interline element in which vertical transfer shift registers are inserted between adjacent columns of a matrix of light-receiving pixels, and a frame transfer element in which an accumulation unit consisting of a plurality of shift registers is disposed adjacent to a light-receiving unit including a matrix of light-receiving pixels are known.

The CCD drive circuit 21 supplies multi-phase transfer clocks for the solid-state image sensing element (CCD) 5 on the basis of externally supplied reference clocks (not shown).

Furthermore, the CCD drive circuit 21 supplies pulses LPP1 and LPP2 to an illumination booster circuit 22 for supplying a power supply voltage to an LED illumination member 7.

The generation timings of these pulses LPP1 and LPP2 will be explained below with reference to FIGS. 5A to 5F.

A case will be exemplified below wherein the LEDs of the LED illumination member 7 are controlled to emit light during the blanking period of vertical scanning, and charges are accumulated on the solid-state image sensing element (CCD) 5.

FIG. 5A shows a vertical blanking signal in which the blanking period is L level.

After this vertical blanking signal goes low, the charges in the solid-state image sensing element (CCD) 5 are wiped out to remove unnecessary charges, as shown in FIG. 5B.

Removal of unnecessary charges is achieved by so-called electron shutter operation by transferring charges accumulated on the individual light-receiving pixels of the solid-state image sensing element (CCD) 5 to unnecessary charge removal drains disposed adjacent to the respective light-receiving pixels.

Furthermore, the unnecessary charge may be transferred to outside of the solid-state image sensing element (CCD) 5 through the horizontal transfer shift registers similar to the signal charges.

After that, when the solid-state image sensing element (CCD) 5 starts exposure, the system controller 1 supplies a drive pulse (FIG. SC) for making the LEDs of the LED illumination member 7 emit light to an LED drive circuit 8 during this exposure period.

In this case, the drive pulse (FIG. 5C) makes the LED emit light when it is H level.

After the LEDs cease to emit light, the charges on the solid-state image sensing element (CCD) 5 are transferred during the charge transfer period shown in FIG. 5B.

Note that charge transfer corresponds to that to vertical shift registers if an interline CCD is used as the solid-state image sensing element (CCD) 5, or corresponds to high-speed transfer from the light-receiving unit to the accumulation unit if a frame transfer CCD is used as the solid-state image sensing element (CCD) 5.

After that, the vertical blanking signal goes high, as shown in FIG. 5A, and the transferred charges are read out in units of lines.

The pulses LPP1 and LPP2 supplied from the CCD drive circuit 21 to the illumination booster circuit 22 are obtained by counting and frequency-dividing a horizontal sync signal (FIG. 5D), as shown in FIGS. 5E and 5F. The pulses LPP2 (FIG. 5F) are output by inverting the pulses LPP1 (FIG. 5E).

The level-shift timings of these pulses LPP1 and LPP2 will be explained below with reference to FIGS. 6A to 6C.

Figure 6A:
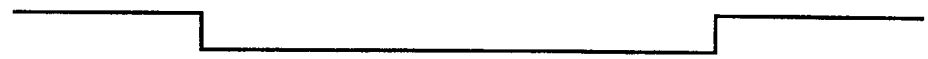
FIGS. 6A to 6C are charts for explaining the level-shift timings of the pulses LPP1 and LPP2 used ir the first embodiment.

FIG. 6A shows a horizontal blanking signal in which the horizontal blanking period is L level.

Figure 6B:
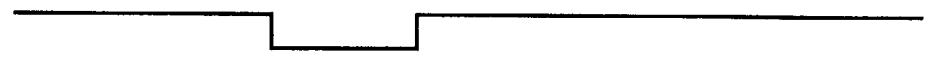

FIG. 6B shows the same horizontal sync signal as in FIG. 5D.

Figure 6C:
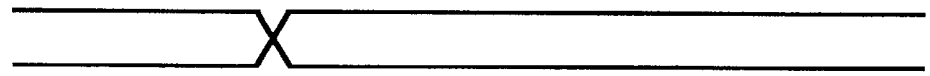

FIG. 6C show the pulses LPP1 or LPP2, and their shift point is synchronous with the trailing edge of the horizontal sync signal.

At the shift point of these pulses LPP1 and LPP2, a large current for driving the capacitance in the illumination booster circuit 22 (to be described later) flows.

Hence, since noise may be superposed on the power supply circuit 3 or circuit ground at that shift point, the shift point is set during the horizontal blanking period outside the effective image period, thus removing adverse influences on the read image.

The illumination booster circuit 22 generates a high voltage as a power supply voltage required for illumination, using the pulses LPP1 and LPP2 output at those timings.

Figure 7:
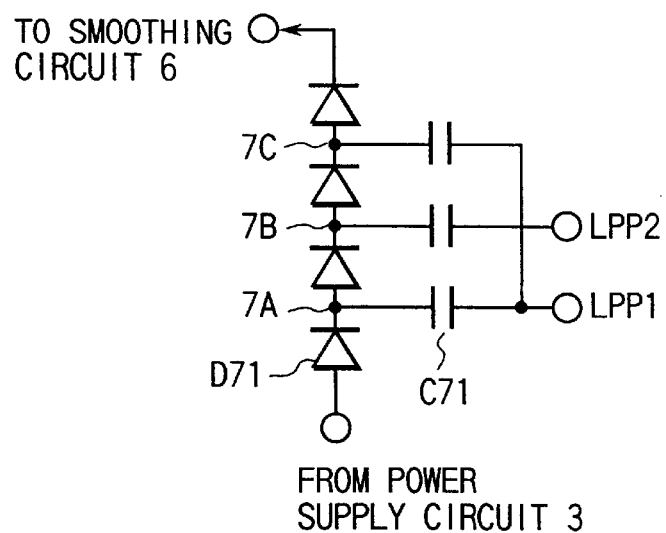
FIG. 7 is a circuit diagram showing the circuit arrangement of an illumination booster circuit 22 used in the first embodiment in detail.

FIG. 7 shows the detailed circuit of this illumination booster circuit 22.

Figure 8:
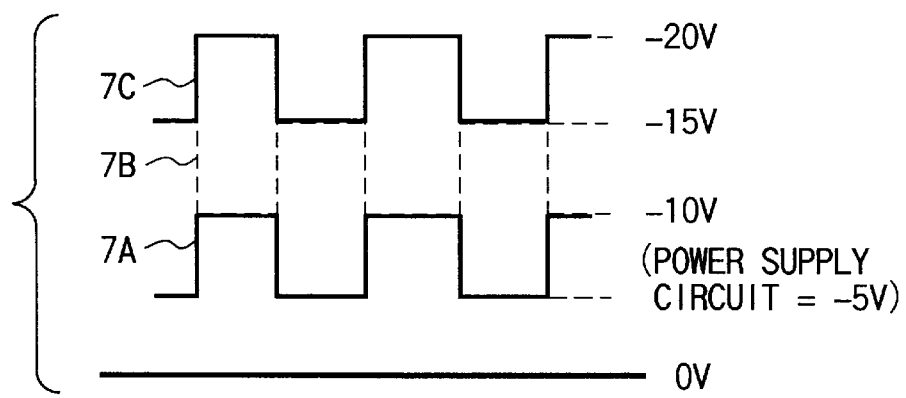
FIG. 8 is a chart showing the waveforms of the respective signals pertaining to the operation of the illumination booster circuit 22 used in the first embodiment.
Figure 9A:
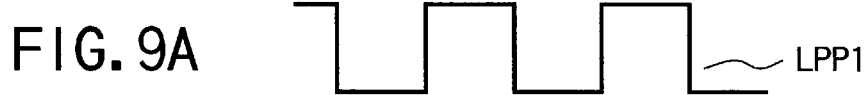
FIGS. 9A and 9B are charts showing the respective signal waveforms pertaining to the operation of the illumination booster circuit 22 used in the first embodiment.
Figure 9B:
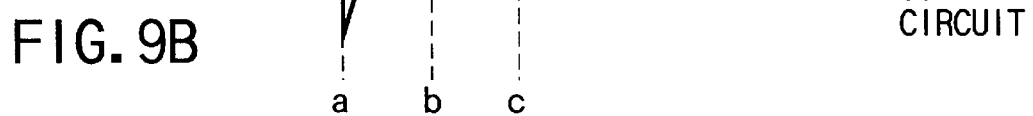

FIG. 8 and FIGS. 9A and 9B show the respective signal waveforms pertaining to the operation of the illumination booster circuit 22.

The operation for adding the voltage of the pulses LPP1 to the voltage supplied from the power supply circuit 3 in the illumination power supply circuit 22 will be explained below.

Assuming that no charge is accumulated on a capacitor C71, the pulse LPP1 is differentiated by this capacitor C71 and is shaped to have a waveform a in FIG. 9B.

More specifically, as shown in FIG. 9A, when the trailing edge of the pulse LPP1 is input, this differential waveform is shaped into a downward peak pulse waveform a shown in FIG. 9B.

When this downward peak pulse waveform is input, a diode D71 is enabled, and the capacitor C71 charges a voltage from the power supply circuit 3.

Subsequently, when the leading edge of this pulse LPP1 is input, the voltage rises by the amplitude of the pulse LPP1, as indicated by b in FIG. 9B.

Since the voltage has risen, the diode D71 is disabled, and the charge accumulated on the capacitor C71 is discharged.

In the circuit shown in FIG. 7, since the discharge period is longer than the charge period, the voltage drops slightly, as indicated by c in FIG. 9B.

After that, since the trailing edge of the pulse LPP1 is input, the capacitor C71 is charged, and L level of the pulse LPP1 is clamped at the voltage of the power supply circuit 3. Hence, the signal at a node 7A in FIG. 7 has a waveform 7A in FIG. 8.

Since the amplitude of the pulse LPP2 is added to the waveform at the node 7A in FIG. 7, the obtained signal has a waveform 7B in FIG. 8.

As the circuit operation at that time is the same as that described above, a description thereof will be omitted.

The amplitude of the pulse LPP1 is added to that output at the node 7A.

Assuming that the voltage of the power supply circuit 3 is 5V and the output amplitude of each of the pulses LPP1 and LPP2 is 5V, and a series circuit of four diodes used in the circuit shown in FIG. 7 has zero voltage loss, an output voltage of 20V (=5×4) as a peak value is obtained.

However, as is well known, the peak voltage becomes lower than 20V in practice due to voltage losses of the diodes.

The output from the illumination booster circuit 22 is input as a power supply voltage of the LED illumination member 7 via a smoothing circuit 6.

The smoothing circuit 6 mainly comprises a capacitor, and can obtain a more stable illumination power supply voltage as the capacitance of the capacitor used is larger or as its internal resistance is smaller.

Figure 3:
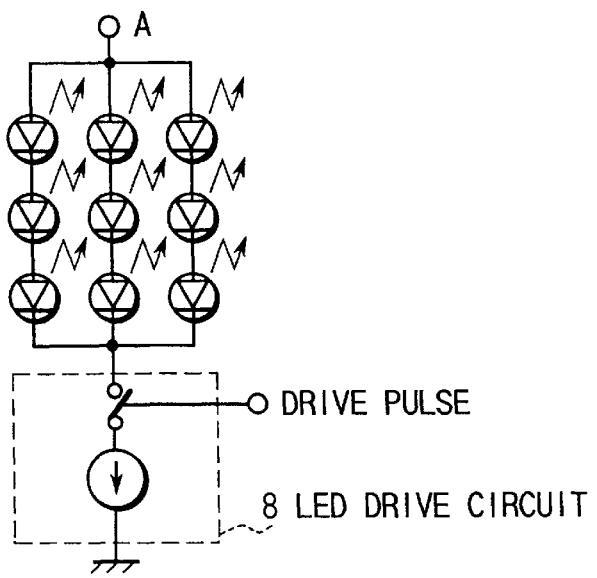
FIG. 3 is a circuit diagram showing a conventional LED drive circuit used in practice.

The LED drive circuit 8 comprises a circuit including a constant current source, as shown in FIG. 3, and operates in response to the drive pulse from the system controller 1.

This drive pulse is output during the exposure period of the solid-state image sensing element (CCD) 5, as shown in FIG. 5C.

As a consequence, the H period in FIG. 5C becomes an essential exposure time.

Figure 2:
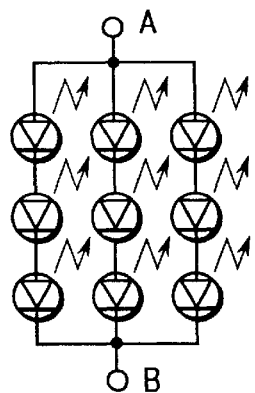
FIG. 2 is a circuit diagram showing the circuit arrangement obtained by connecting a plurality of LEDs in series with each other as the illumination light-emitting member of the conventional self-illumination scanner apparatus.

The LED illumination member 7 comprises a plurality of LEDs, as shown in FIG. 2.

The terminal A in FIG. 2 is connected to the illumination booster circuit 22 side, and the terminal B to the LED drive circuit 8.

In FIG. 4, the LED illumination member 7 illuminates a sheet surface 9 as the surface to be sensed including various kinds of images such as a code pattern and the like, and light reflected by the surface 9 enters the solid-state image sensing element 5 such as a CCD via a lens 10.

The incoming reflected light is photoelectrically converted by the solid-state image sensing element (CCD) 5, and is input to a signal processing circuit 23 as a sensed image signal.

The signal processing circuit 23 performs various kinds of signal processing such as sample & hold, signal amplification, analog-to-digital conversion, and the like, and outputs a digital image signal.

To recapitulate, according to this embodiment, since a high-voltage generation circuit for driving the LED illumination member 7 makes use of existing pulses in the apparatus, a power supply voltage can be supplied by a low-cost, small-scale circuit.

Also, according to this embodiment, since the illumination power supply automatically stops when the image sensing circuit has stopped, the illumination power supply can be turned off simultaneously when the power supply of the image sensing circuit is turned off to attain power savings.

SECOND EMBODIMENT

The second embodiment of the present invention will be explained below with reference to FIG. 10.

The second embodiment is especially characterized in that a current amplification buffer circuit 24 for each of the pulses LPP1 and LPP2 is inserted between the CCD drive circuit 21 and illumination booster circuit 22.

Since other arrangements of the second embodiment are the same as those in the first embodiment, a detailed description thereof will be omitted.

More specifically, the pulses LPP1 and LPP2 output from the CCD drive circuit 21 are supplied to the illumination booster circuit 22 as pulses LPP1' and LPP2' via the current amplification buffer circuit.24.

The reason why this current amplification buffer circuit 24 is inserted is to prevent the output current from increasing beyond the allowable loss range of an IC that constructs the CCD drive circuit 21 in practice, if the capacitor in the illumination booster circuit 22 is directly driven to boost using the pulses LPP1 and LPP2 from the CCD drive circuit 21.

Hence, by inserting the current amplification buffer circuit 24, the current supplied from the IC that mounts the CCD drive circuit 21 decreases, and can be prevented from exceeding the allowable loss range of the IC.

Figure 11:
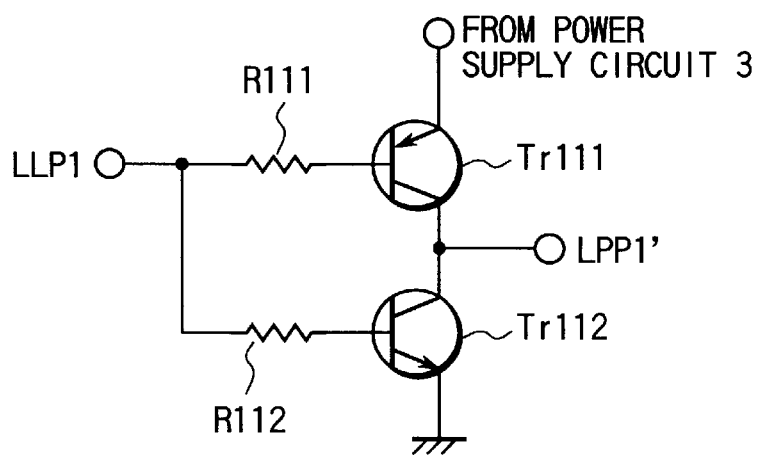
FIG. 11 is a circuit diagram showing an example of a current amplifying buffer circuit 24 used in the second embodiment.

FIG. 11 shows an example of the current amplification buffer circuit 24.

More specifically, according to this circuit arrangement, since the output oscillates from the voltage of the power supply circuit 3 to GND level, a high output amplitude can be obtained, and consequently, a high boosted voltage can be obtained.

The operation of FIG. 11 will be explained below.

When the input pulse LPP1 is H level, a transistor Tr112 saturates via a resistor R122, and the output pulse LPP1' becomes the GND potential.

When the input pulse LPP1 is L level, a transistor Tr111 saturates via a resistor R111, and the output LPP1' becomes a potential equal to the voltage from the power supply circuit 3.

The same applies to the pulse LPP2 to obtain an output pulse LPP2'.

In the circuit arrangement shown in FIG. 11, the output pulses LPP1' and LPP2' respectively have voltage waveforms obtained by inverting those of the input pulses LPP1 and LPP2.

The resistors R111 and R112 are inserted for the purpose of limiting the current from the CCD drive circuit 21, and the output current from the IC that mounts the CCD drive circuit 21 is limited below a predetermined value depending on their resistances.

For this reason, since the output current of the current amplification buffer circuit 24 is supplied from the power supply circuit 3, the load viewed from the IC side of the CCD drive circuit 21 becomes light.

In this case, the current amplification buffer circuit 24 uses the power supply circuit 3 as a power supply so as to commonize the power supply. Evidently, another power supply may be inserted instead.

THIRD EMBODIMENT

The third embodiment of the present invention will be explained below with reference to FIGS. 12A to 12F.

Figure 10:
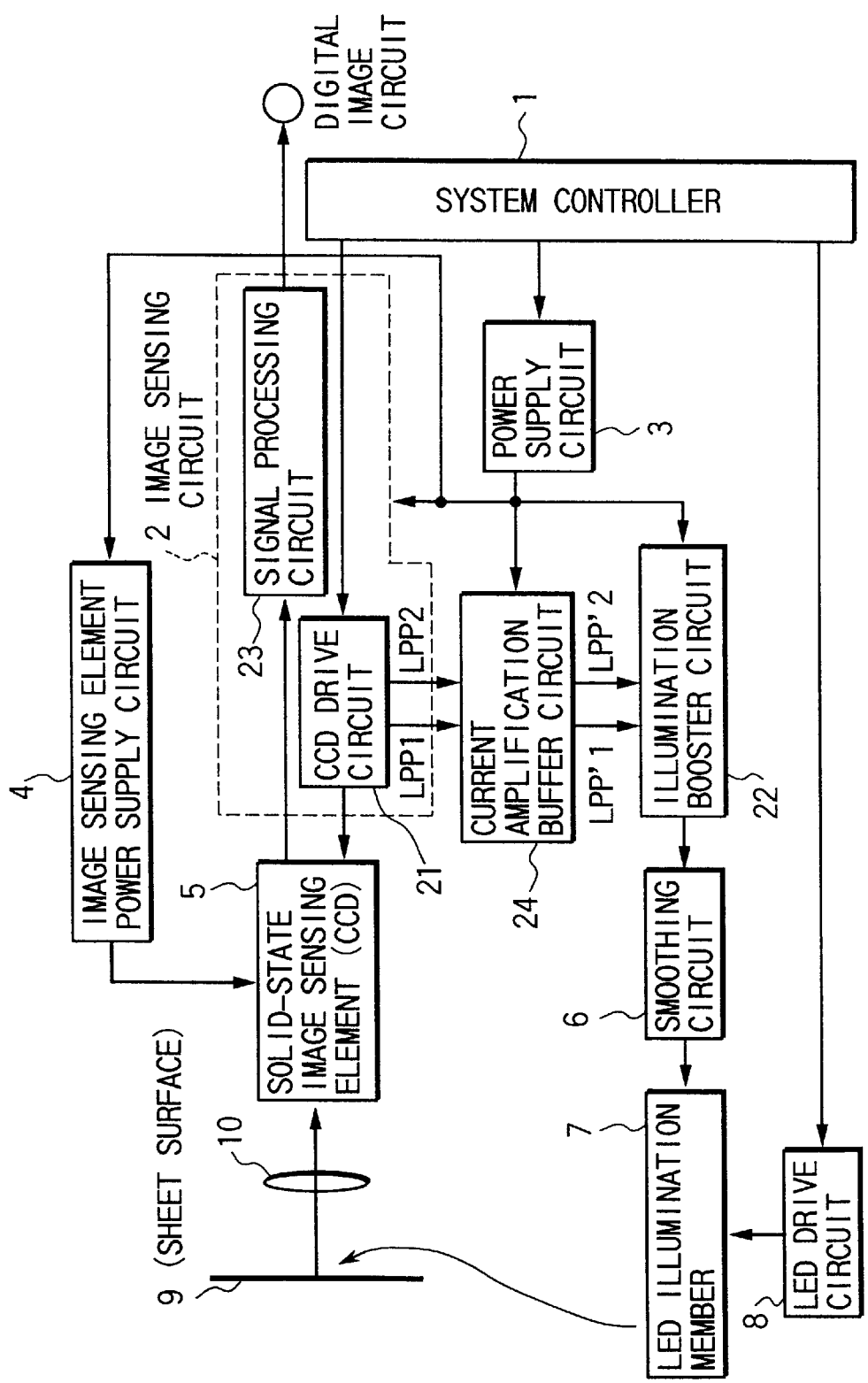
FIG. 10 is a block diagram showing the circuit arrangement of a self-illumination scanner apparatus according to the second embodiment of the present invention.

Since the circuit block arrangement of this embodiment is the same as that shown in FIG. 4 or 10 in the first or second embodiment, a detailed description thereof will be omitted.

The third embodiment is characterized by the signal patterns of the pulses LPP1 and LPP2.

Figure 12A:
FIGS. 12A to 12F are charts for explaining the signal patterns of pulses LPP1 and LPP2 used in a self-illumination scanner apparatus according to the third embodiment of the present invention.
Figure 12B:
Figure 12C:
Figure 12D:

More specifically, the pulse widths (12A and 12B) of the pulses LPP1 and LPP2 shown in FIGS. 12C and 12D are set to be smaller than those in other periods, during a predetermined period including at least the LED light emission period (5C) shown in FIG. 12A, which is set in the vertical blanking period excluding the read period of an effective sensed image signal from the solid-state image sensing element (CCD) 5.

Figure 12E:
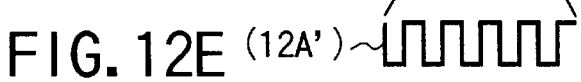
Figure 12F:

FIGS. 12E and 12F show the enlarged waveforms of high-frequency pulse periods with such small pulse widths.

When these high-frequency pulses are used, the period between the trailing and leading edges of the pulse LPP1 is shortened; the charge frequency increases and the discharge time can be shortened. Hence, boosting efficiency can be improved.

The pulses LPP1 and LPP2 are set to be high-frequency pulses during the predetermined period so as to minimize any power supply voltage drop upon driving a heavy load and to reduce the load on the image sensing circuit power supply during the period other than the LED light emission period (actual influences appear not within but outside the LED light emission period in terms of time constants).

The load on the illumination booster circuit 22 is heavy when the LEDs of the LED illumination member 7 emit light.

If power supply voltage drop is minimized when the load is heavy, electric power required for boosting and supplied from the power supply circuit 3 during the period other than the LED light emission period can be reduced.

Since the period other than the LED light emission period includes the read period of signal charges from the solid-state image sensing element (CCD) 5, power supply variations can be suppressed when the load on the power supply circuit 3 is reduced during such period, thus reducing noise superposed on the signal.

The high-frequency period of the pulses LPP1 and LPP2 is preferably selected within the vertical blanking period to minimize noise superposed on the signal even if high-frequency pulses are set, since that period falls outside the signal charge read period.

According to this embodiment, a circuit arrangement that can further reduce influences of noise arising from variations in power supply can be realized.

The present invention has been described in detail, but is not limited to the above embodiments and various modifications may be made.

More specifically, for example, the solid-state image sensing element (CCD) 5 may use a line sensor or the like in place of the area sensor, and the power supply voltage in the apparatus to be used may be obtained from a power supply circuit in another circuit system in place of the above-mentioned power supply circuit.

As described above, according to the present invention, a self-illumination scanner apparatus which can attain its size reduction by effectively using an existing predetermined power supply in the apparatus and a predetermined pulse used for driving a solid-state image sensing element, and can maximize the reading performance of an image as the surface to be sensed can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A self-illumination scanner apparatus comprising:

an illumination light-emitting member which comprises an LED group obtained by connecting a plurality of LEDs in series with each other, and illuminates a surface to be sensed including an image;

a solid-state image sensing element for receiving light reflected by the surface to be sensed illuminated by said illumination light-emitting member, and generating an image signal corresponding to the image of the surface;

a drive circuit for controlling driving of said solid-state image sensing element to sense the image; and a booster circuit which serves as a power supply circuit for said illumination light-emitting member, and generates a high voltage by piling up a predetermined power supply voltage in said apparatus, and a frequency-divided pulse obtained by frequency-dividing a predetermined pulse output from said drive circuit.

2. An apparatus according to claim 1, wherein the predetermined power supply voltage in said apparatus is a power supply voltage to be supplied to at least one of said solid-state image sensing element and said drive circuit before the power supply voltage is boosted to a voltage value required for at least one of said solid-state image sensing element and said drive circuit.

3. An apparatus according to claim 1, wherein said booster circuit piles a plurality of frequency-divided pulses with different phases as the frequency-divided pulse to the predetermined power supply voltage in said apparatus, and outputs the sum voltage.

4. An apparatus according to claim 3, wherein said self-illumination scanner apparatus inputs the frequency-divided pulse to said booster circuit via a current amplification buffer circuit corresponding to the frequency-divided pulse.

5. An apparatus according to claim 1, wherein said self-illumination scanner apparatus inputs the frequency-divided pulse to said booster circuit via a current amplification buffer circuit corresponding to the frequency-divided pulse.

6. An apparatus according to claim 1, wherein a frequency of the frequency-divided pulse during a predetermined period including at least an emission period of said illumination light-emitting member, which is set in a vertical blanking period excluding a read-out period of an effective sensed image signal from said solid-state image sensing element, is set to be higher than a frequency of the frequency-divided pulse during other periods different from the predetermined period.

* * * * *